United States Patent [19]

Mattern

[11] Patent Number: 5,535,730
[45] Date of Patent: Jul. 16, 1996

[54] APPARATUS AND METHODS FOR REMOVING HAZARDOUS CONTENTS FROM COMPRESSED GAS CYLINDERS

[75] Inventor: Charles C. Mattern, Clermont, Fla.

[73] Assignee: Earth Resources Corporation, Ocoee, Fla.

[21] Appl. No.: 246,090

[22] Filed: May 19, 1994

Related U.S. Application Data

[62] Division of Ser. No. 55,852, Apr. 30, 1993, Pat. No. 5,339,876.

[51] Int. Cl.$^6$ ................................................. B65B 31/00
[52] U.S. Cl. ........................... 124/71; 124/75; 124/73; 124/80
[58] Field of Search ................................ 102/501, 517, 102/527; 89/7, 8, 1.14; 124/70, 71, 75, 74, 73, 56, 80; 137/68.1; 273/428; D22/115; 411/377, 369, 431, 440, 441, 915, 542, 903

[56] References Cited

U.S. PATENT DOCUMENTS

| | | |
|---|---|---|
| Re. 33,799 | 1/1992 | Gold et al. . |
| 381,950 | 5/1888 | Pratt .................................... 124/70 X |
| 2,101,762 | 12/1937 | Straub . |
| 3,394,905 | 7/1968 | Rapp .................................... 102/517 X |
| 3,422,808 | 1/1969 | Stein et al. . |
| 3,993,221 | 11/1976 | Boynton et al. . |
| 4,046,055 | 9/1977 | McDanalds et al. ................. 89/1.14 X |
| 4,110,929 | 9/1978 | Weigand . |
| 4,166,481 | 9/1979 | Farris et al. . |
| 4,349,054 | 9/1982 | Chipman et al. . |
| 4,665,827 | 5/1987 | Ellis .................................... 102/517 X |
| 4,690,180 | 9/1987 | Gold et al. . |

(List continued on next page.)

FOREIGN PATENT DOCUMENTS 1607991  10/1970  Germany .

OTHER PUBLICATIONS

Memo, New Jersey State Department of Environmental Protection, Feb./04/1982, two pages.
"No Known Treatment For Accident Victims," *Sunday Times*, Trenton, New Jersey, Feb./28/1982, p. B7.
"This Stuff Is Getting To ALL Of US!," *Fire Engineering*, Apr. 1983, pp. 21, 25–28.
"Poison Spills Impact Remains," *Richmond Times–Dispatch*, Mar./16/1983, pp. A1–A2.
"Something Out Of A Space Movie," *Richmond Times–Dispatch*, Feb./1982, pp. A1–A2.
"Pentaborane Release, Environmental Laboratories, Hanover Country, VA," National Response Team Briefing, Mar./1982, pp. 1–2.
Memo, CECOS International, Inc, to Environmental Emergency Branch, Mar./17/1982, pp. 1–5.
Department of the Army, Office of the AMC Program Manager for Demilitarization of Chemical Material, "Supplement C to Project Eagle–Phase II Demilitarization and Disposal of the M34 Cluster at Rocky Mountain Arsenal Final Plan" (Feb. 1973), pp. Viii–ixm 15–21, 1C–1, 2C–15.
Solkatronic Chemicals, Inc., *Instruction Manual for Model 5502 Emergency Reponse Containment Vessel*, Oct. 1990.

*Primary Examiner*—Anthony Knight
*Attorney, Agent, or Firm*—Baker & Botts

[57] ABSTRACT

A containment vessel is provided to allow the safe, environmentally acceptable release and recontainerization or other processing of hazardous contents from compressed gas cylinders or other target container. The containment vessel is used to position a gas cylinder or other target container adjacent to one or more pneumatic guns. A variety of projectiles are provided for use with the pneumatic guns to pierce the body of the target container. A pneumatic chamber and gun barrel are attached to the containment vessel intermediate the ends to fire a projectile which will puncture the target. Connections are provided for communicating with the containment vessel for evacuating and recontainerizing the contents released by rupturing the target without releasing the contents into the environment. All of the gas cylinder processing operations may be conducted remotely.

13 Claims, 2 Drawing Sheets

U.S. PATENT DOCUMENTS

| | | |
|---|---|---|
| 4,881,517 | 11/1989 | Wackrow . |
| 4,944,333 | 7/1990 | Gold et al. . |
| 5,017,047 | 5/1991 | Myles et al. . |
| 5,025,730 | 6/1991 | Petrovizh ............................ 102/501 X |
| 5,035,269 | 7/1991 | Pytryga et al. . |
| 5,067,529 | 11/1991 | Gonzalez-Miller . |
| 5,114,043 | 5/1992 | Collins, Jr. . |
| 5,150,909 | 9/1992 | Fitzwater ................................ 273/428 |
| 5,163,483 | 11/1992 | Eckman . |
| 5,163,585 | 11/1992 | Campbell . |
| 5,186,219 | 2/1993 | Gold et al. . |
| 5,265,762 | 11/1993 | Campbell et al. . |
| 5,325,787 | 7/1994 | Boual ................................ 102/517 X |
| 5,339,876 | 8/1994 | Mattern . |
| 5,365,913 | 11/1994 | Walton ...................................... 124/75 |

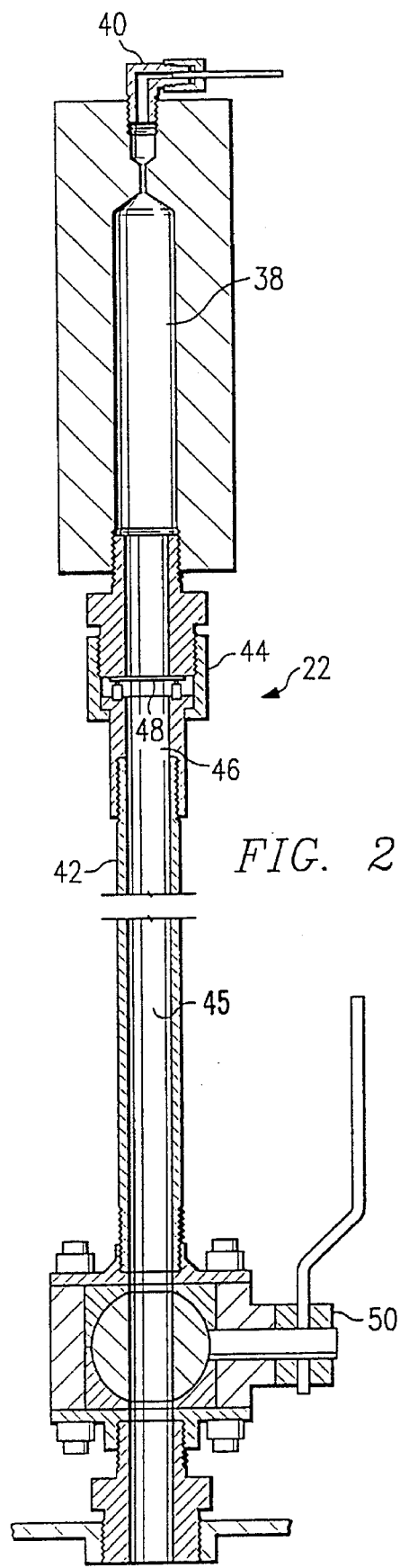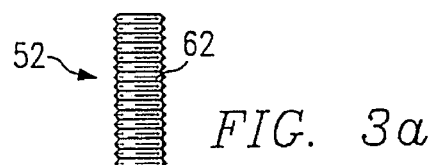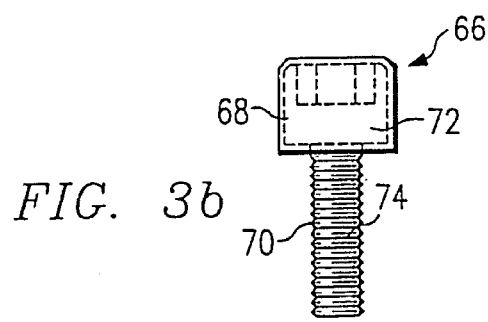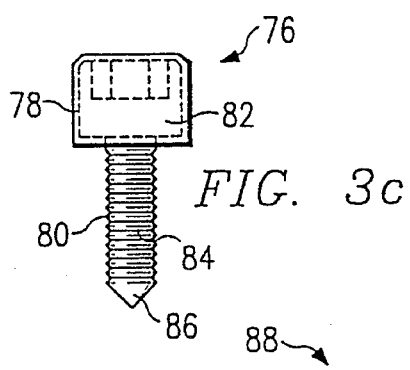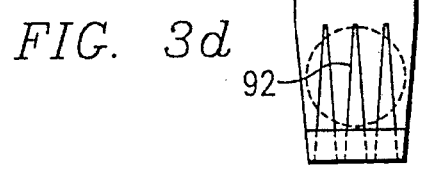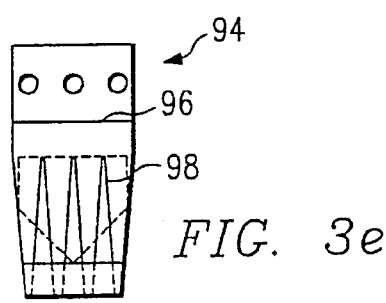

APPARATUS AND METHODS FOR REMOVING HAZARDOUS CONTENTS FROM COMPRESSED GAS CYLINDERS

This application is a division of application Ser. No. 08/055,852, filed Apr. 30, 1993, now U.S. Pat. No. 5,339,876.

TECHNICAL FIELD OF THE INVENTION

This invention relates to the field of managing compressed gas cylinders and particularly compressed gas cylinders in a deteriorated condition.

BACKGROUND OF THE INVENTION

Compressed gas cylinders may become unserviceable for several reasons such as valve assembly failure, damage or deterioration to the cylinder body, and/or damage or deterioration of pipe/hose connections associated with the valve assembly. The hazardous nature of compressed gas cylinders in a deteriorated condition has become the focus of increasing attention resulting in government regulations which limit the uncontrolled discharge of their contents to the environment.

Examples of cylinder rupture vessels or containment vessels used for safely removing hazardous contents from deteriorated compressed gas cylinders are shown in U.S. Pat. No. 4,690,180 titled "Cylinder Rupture Vessel"; U.S. Pat. No. 4,944,333 titled "Cylinder Rupture Vessel with Clamps for Immobilizing a Container Within the Vessel", and U.S. Pat. No. 5,186,219 titled "Cylinder Rupture Vessel". These patents disclose containment vessels and their associated systems to secure a gas cylinder or similar container within the containment vessel and to puncture or pierce the cylinder in a safe, controlled manner. The cylinder rupture vessels and their associated systems allow for environmentally acceptable removal of the contents from the cylinder and further processing of the contents as desired. The above-listed patents are incorporated by reference for all purposes within this application.

Deteriorated gas cylinders may be ruptured in a safe, controlled manner by using a puncture spike or punch as shown in U.S. Pat. No. 4,690,180. Hydraulic drill assemblies, as shown in U.S. Pat. No. 4,944,333, have also been used to penetrate gas cylinders to allow the controlled release of the contents of the cylinders within a containment vessel. In addition, various types of projectiles have previously been fired at gas cylinders positioned within a containment vessel to rupture the walls of the gas cylinder to release the contents from the gas cylinder into the interior of the containment vessel.

SUMMARY OF THE INVENTION

In accordance with the present invention, a containment vessel and its associated systems are provided to substantially eliminate or reduce disadvantages and problems associated with prior systems for releasing the contents from deteriorated pressurized cylinders or other types of containers.

The present invention was developed to allow the cylinder contents to be released in a contained and controlled environment by remote operation. Accessing the contents of a cylinder in a containment vessel permits identification and proper disposal in accordance with government regulations without adversely affecting the environment. One function of the present invention is to provide a means of accessing the contents of pressurized compressed gas cylinders in a safe, environmentally acceptable manner.

A technical advantage of the present invention is that it provides an environmentally safe methodology for sampling and recontainerizing or disposing of compressed gases, liquids or other material stored in pressurized cylinders of various sizes, configurations, and pressures that are in a deteriorating or damaged condition.

Another technical advantage of the present invention is that it provides a primary containment vessel which can be operated inside of an airtight secondary containment structure by remote control from outside of the secondary containment structure thereby providing a high safety factor for the environment and personnel.

A further technical advantage of the present invention is that it provides a simple, reliable mechanism for use in aggressive chemical environments which is mobile and which can be quickly deployed to the location of target cylinders without having to move the cylinders over public byways.

In accordance with one aspect of the present invention, an improved projectile is provided to pierce high pressure cylinders and/or thick wall containers. The improved projectile has a relatively large mass to develop sufficient momentum for piercing a selected target while the portion of the projectile that actually pierces the selected target has a small cross sectional area to enhance penetration capabilities.

A significant technical advantage of the present invention includes providing a projectile with multiple portions. The projectile initially has a relatively large mass and a relatively large cross section to develop sufficient momentum to pierce a selected target. The exterior of the projectile is selected to minimize friction losses with the bore of the associated pneumatic gun barrel. The portion of the projectile which pierces the selected target has a small cross sectional area for improved penetration. Other portions of the projectile have a larger cross sectional area and do not penetrate the selected target.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a schematic drawing in section with portions broken away showing a pneumatic gun for use with the containment vessel of FIG. 1; and FIGS. 3a through 3e are drawings in elevation showing various projectiles satisfactory for use with the pneumatic gun of FIG. 2 and the containment vessel of FIG. 1.

DETAILED DESCRIPTION OF THE INVENTION

Figure 1:
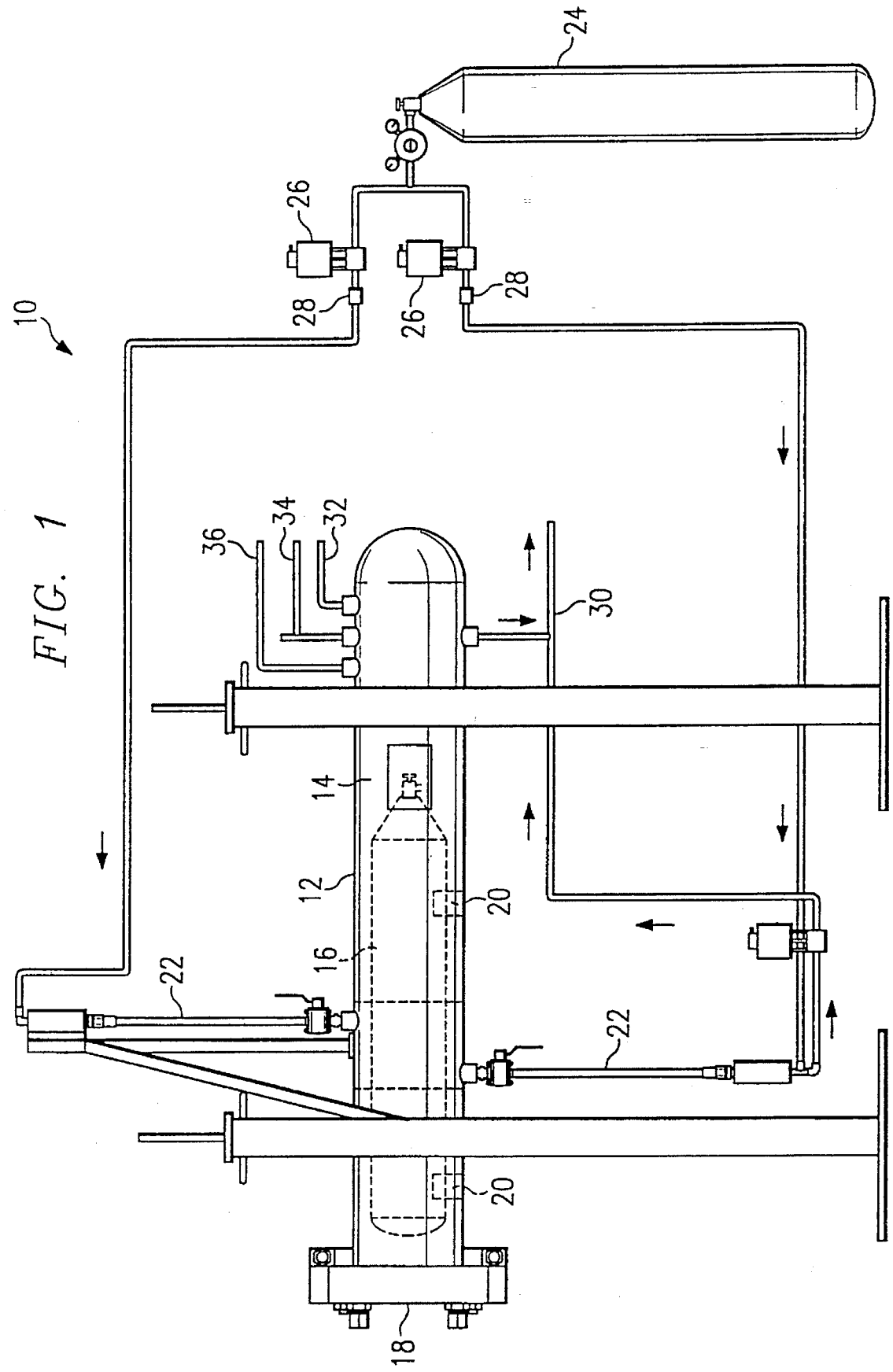
FIG. 1 is a schematic drawing in elevation with portions broken away of a containment vessel and associated systems incorporating the present invention.

The preferred embodiments of the present invention and its advantages are best understood by referring to FIG. 1 through FIG. 3e of the drawings, like numerals being used for like and corresponding parts of the various drawings.

FIG. 1 illustrates a system indicated generally at 10 constructed according to the teachings of the present invention for removing hazardous contents from compressed gas cylinders. System 10 comprises a mobile, airtight containment vessel 12 having a hollow enclosed chamber 14 of appropriate size to house a target compressed gas cylinder 16 whose contents are to be removed. An access member 18 is provided at one end of containment vessel 12 for communicating with enclosed chamber 14 of containment vessel 12. V-shaped bearing plates 20 are disposed transverse to the longitudinal axis and along the bottom of containment vessel 12. With access member 18 removed from containment vessel 12, cylinder 16 is placed in containment vessel 12 and is supported by plates 20. Plates 20 may be suitably positioned to support and to center a cylinder 16 of various conventional sizes.

Two pneumatic guns 22 are connected to containment vessel 12 such that pneumatic guns 22 are in communication with enclosed chamber 14. Pneumatic guns 22 provide a mechanism for system 10 to puncture cylinder 16 thereby facilitating the removal of the contents of cylinder 16. Pneumatic guns 22 may, for example, be offset longitudinally and radially from each other as shown in FIG. 1. The pneumatic gun 22 connected to the bottom of containment vessel 12 may be appropriately positioned to maximize the drainage from a cylinder 16 containing a compressed liquid when punctured by pneumatic gun 22. Additionally, containment vessel 12 may be tilted along its longitudinal axis to facilitate removal of liquids from cylinder 16.

A remote inert high pressure compressed gas supply 24 is connected to pneumatic guns 22 through high pressure valves 26. Gas supply 24 may comprise, for example, a supply of He, $N_2$, Ar, or other appropriate inert gas. The directional flow of inert gas from gas supply 24 to pneumatic guns 22 is controlled by check valves 28.

Containment Vessel 12 contains four additional connection ports. First, an evacuation port 30 is connected to the bottom of containment vessel 12 in communication with enclosed chamber 14 for evacuating the contents released from cylinder 16 during operation of system 10. Second, a vacuum port 32 is connected to containment vessel 12 in communication with enclosed chamber 14. A conventional vacuum pump (not shown) may be connected to vacuum port 32 for purging air and other gases from enclosed chamber 14. Third, pressure control port 34 is connected to containment vessel 12 in communication with enclosed chamber 14 for controlling pressure in enclosed chamber 14. Finally, inert gas port 36 is connected to containment vessel 12 in communication with enclosed chamber 14 for introducing inert gas, such as He, $N_2$, Ar, or other appropriate inert gas, into enclosed chamber 14.

In operation, system 10 removes hazardous contents from cylinder 16 by loading cylinder 16 into enclosed chamber 14 of containment vessel 12 through an opening in containment vessel 12. Access member 18 is placed over the opening of containment vessel 12 to seal enclosed chamber 14. Air and other gasses may be purged from enclosed chamber 14 via vacuum port 32 by a vacuum pump (not shown). An inert gas, such as He, $N_2$, At, or other appropriate inert gas, may be introduced into enclosed chamber 14 of containment vessel 12 through inert gas port 36 until the atmosphere in enclosed chamber 14 is substantially inert. An inert gas environment in enclosed chamber 14 will substantially reduce the risk of a violent reaction within enclosed chamber 14 upon release of the contents of cylinder 16.

Once enclosed chamber 14 is loaded with cylinder 16 as described above, the pneumatic guns 22 may be fired. Pneumatic pressure supplied from gas supply 24 via valves 26 and 28 causes pneumatic guns 22 to propel projectiles, as shown in FIGS. 3a–3e, at cylinder 16 thereby rupturing cylinder 16. For safety reasons, gas supply 24 may be remotely activated to provide inert gas to pneumatic guns 22. The details of pneumatic guns 22 and the projectiles are described below with respect of FIG. 2 through FIG. 3e.

FIG. 2 illustrates a pneumatic gun 22 for use with system 10 of FIG. 1. Pneumatic gun 22 comprises a pneumatic reservoir 38 and a connector 40 for attaching a source of pneumatic pressure to reservoir 38. In the embodiment of FIG. 1, pneumatic pressure is supplied to reservoir 38 via connector 40 from gas supply 24. A barrel 42 is connected to an end of reservoir 38 opposite connector 40 by a detachable coupling 44. Barrel 42 comprises bore 45 extending longitudinally therethrough and having a first portion 46 at the end of barrel 42 adjacent coupling 44. If desired, the inside diameter of portion 46 may be reduced to assist with releasably positioning a projectile therein.

A rupture disc 48 designed to fail at a predetermined pressure is disposed in longitudinal bore 45 between barrel 42 and reservoir 38. The volume of reservoir 38 is at least approximately equal to the volume of barrel 42. A valve 50 connects barrel 42 with containment vessel 12 to control communication between barrel 42 and enclosed chamber 14.

In operation, pneumatic gun 22 is loaded by disengaging coupling 44 from reservoir 38 and sliding coupling 44 down the outer surface of barrel 42 until reservoir 38 is able to move clear of barrel 42. A projectile, such as shown in FIGS. 3a–3e, may be inserted into barrel 42 at first portion 46. Rupture disc 48 is placed across the exposed end of barrel 42. Reservoir 38 is repositioned over barrel 42 such that ruptured disc 48 is disposed to separate barrel 42 from reservoir 38. Coupling 44 is repositioned on barrel 42 to again securely connect reservoir 38 with barrel 42. In this configuration, pneumatic gun 22 is ready to propel a projectile at the cylinder 16 in enclosed chamber 14.

To launch the projectile, gas supply 24 is remotely activated to provide inert gas to reservoir 38. The gas pressure in reservoir 38 increases until it reaches the predetermined pressure at which ruptured disc 48 will fail or rupture leaving a hole approximately equal in size to the cross-sectional area of longitudinal bore 45 of barrel 42 below rupture disc 48. The predetermined pressure at which rupture disc 48 fails depends on the material and design of rupture disc 48. Therefore, the speed at which the projectile is propelled at cylinder 16 by pneumatic gun 22 is controlled in part by the selection of the material and design for rupture disc 48. For example, a rupture disc 48 made from a material that will fail at a higher pressure will propel a projectile at a higher speed. The force of the pressurized gas in reservoir 38 is released against the back of the projectile causing the projectile to accelerate to a speed that will pierce cylinder 16. In this manner, ruptured disc 48 comprises the trigger mechanism for pneumatic gun 22.

In addition to gas pressure in reservoir 38, the mass of a projectile placed in longitudinal bore 45 and the effective cross sectional area determine the amount of momentum imparted to the projectile by pneumatic gun 22. High momentum at the point of impact is required to penetrate high pressure/thick wall containers.

In the event that the projectile does not pierce cylinder 16, pneumatic gun 22 may be reloaded. Prior to reloading pneumatic gun 22, valve 50 is closed to isolate barrel 42 from enclosed chamber 14. This allows repeated attempts to puncture cylinder 16 without having to remove cylinder 16 from enclosed chamber 14. To determine if cylinder 16 is successfully punctured, enclosed chamber 14 may be monitored during operation of system 10 by means of a closed-circuit video or pressure and temperature transducers (not shown).

In FIG. 2, longitudinal bore 45 is shown with a uniform inside diameter. If desired, bore 45 may be tapered to improve the performance of selected projectiles.

FIGS. 3a through 3e illustrate five embodiments of a projectile for use with pneumatic gun 22 of system 10. Each embodiment of the projectile comprises interior and exterior portions.

FIG. 3a illustrates a projectile incorporating the present invention indicated generally at 52. Projectile 52 comprises exterior portion 54 and interior portion 56. Interior portion 56 has two parts—a metal bolt and a hexagonal shaft. Projectile 52 comprises a generally circular cross-section approximately equal to the cross-sectional area of bore 45 in barrel 42.

Exterior portion 54 comprises a deformable material, such as polytetrafluroethylene for reducing friction between projectile 52 and longitudinal bore of barrel 42 upon acceleration of projectile 52 toward enclosed chamber 14. Exterior portion 54 is sized to fit snugly in bore 45 of barrel 42 thereby forming a fluid barrier which reduces pneumatic pressure leakage past projectile 52. Interior portion 56 of projectile 52 comprises a metal bolt with a head 58 surrounded by exterior portion 54 and a threaded shaft 62 extending in one direction from head 58 and a non-threaded shaft 64 extending in the other direction from head 58. Shaft 64 may comprise a hexagonal shape.

When projectile 52 contacts cylinder 16, non-threaded shaft 64 will penetrate the wall of cylinder 16 while head 58 prevents the remainder of projectile 52 from penetrating cylinder 16. The ratio of the mass of non-threaded portion 64 as compared with the other portions of projectile 52 is selected to optimize the transfer of energy to non-thread portion 64 when projectile 52 contacts cylinder 16. Various types of bonding may be used to secure non-threaded portion 64 to head 58 until projectile 52 contacts cylinder 16. Also, the length and cross sectional area of non-threaded portion 64 may be selected to optimize the penetration capability of projectile 52 with respect to different types of cylinders 16.

One embodiment of the present invention which performs satisfactorily includes a projectile 52 with a total weight of approximately fifty grams and a diameter of approximately ¾ inch. Non-threaded portion 64 weights approximately eleven grams and the bolt weights approximately forty nine grams.

FIG. 3b illustrates a projectile indicated generally at 66. Projectile 66 comprises exterior portion 68 and interior portion 70. Projectile 66 comprises a generally circular cross-section approximately equal to the cross-sectional area of bore 45 in barrel 42. Exterior portion 68 comprises a deformable material, such as polytetrafluroethylene, for reducing friction between projectile 66 and longitudinal bore of barrel 42 upon acceleration of projectile 66 toward enclosed chamber 14. Exterior portion 68 is sized to fit snugly portion 46 of barrel 42 thereby forming a fluid barrier. Interior portion 70 of projectile 66 comprises a metal bolt with a head 72 surrounded by exterior portion 68 and a threaded shaft 74 extending in one direction from head 72.

FIG. 3c illustrates a projectile indicated generally at 76. Projectile 76 comprises exterior portion 78 and interior portion 80. Projectile 76 comprises a generally circular cross-section approximately equal to the cross-sectional area of bore 45 in barrel 42. Exterior portion 78 comprises a deformable material, such as polytetrafluroethylene, for reducing friction between projectile 76 and longitudinal bore of barrel 42 upon acceleration of projectile 76 toward enclosed chamber 14. Exterior portion 78 is sized to fit snugly in first portion 46 of barrel 42 thereby forming a fluid barrier. Interior portion 80 of projectile 76 comprises a metal bolt with a head 82 surrounded by exterior portion 78 and a threaded shaft 84 extending in one direction from head 82 having a pointed tip 86 on one end opposite from head 82.

FIG. 3d illustrates a projectile indicated generally at 88. Projectile 88 comprises exterior portion 90 and interior portion 92. Projectile 88 comprises a generally circular cross-section approximately equal to the cross-sectional area of bore 45 in barrel 42. Exterior portion 90 comprises a deformable material, such as a packing material, for reducing friction between projectile 90 and longitudinal bore of barrel 42 upon acceleration of projectile 88 toward enclosed chamber 14. Exterior portion 90 is sized to fit snugly in first portion 46 of barrel 42 thereby forming a fluid barrier. Interior portion 92 of projectile 88 comprises a metal ball.

FIG. 3e illustrates a projectile indicated generally at 94. Projectile 94 comprises exterior portion 96 and interior portion 98. Exterior portion 96 comprises a deformable material, such as a packing material, for reducing friction between projectile 94 and longitudinal bore of barrel 42 upon acceleration of projectile 94 toward enclosed chamber 14. Exterior portion 96 is sized to fit snugly in first portion 46 of barrel 42 thereby forming a fluid barrier. Interior portion 98 of projectile 94 comprises a metal wedge.

The present invention is not limited to use with only compressed gas cylinders. Various types of containers may be positioned within enclosed chamber 14 for the safe, controlled release of such containers. Also, various projectiles with two or more portions may be designed in accordance with the present invention to improve the penetration capability of a selected projectile with respect to a selected target.

Although the present invention and its advantages have been described in detail, substitutions and alterations can be made without departing from the spirit and scope of the invention as defined by the following claims.

What is claimed is:

1. A pneumatic gun for use in piercing containers disposed within an enclosed chamber provided by a containment vessel comprising:

the pneumatic gun having a barrel communicating with the enclosed chamber of the containment vessel;

a valve installed at one end of the barrel of the pneumatic gun to block communication with the enclosed chamber; and, a pneumatic reservoir attached to the barrel opposite from the enclosed chamber.

2. The pneumatic gun as defined in claim 1 further comprising:

a first connection for releasably engaging the pneumatic reservoir with the barrel; and a second connection for attaching a source of pneumatic pressure to the reservoir.

3. The pneumatic gun as defined in claim 1 further comprising:

the barrel having a bore extending longitudinally therethrough;

the longitudinal bore having a first portion to receive a projectile therein; and a rupture disc disposed in the longitudinal bore between the first portion and the pneumatic reservoir.

4. The pneumatic gun as defined in claim 3 wherein the value comprises an isolation valve disposed between the enclosed chamber and the first portion of the longitudinal bore.

5. A projectile for use with a pneumatic gun comprising:

a first portion for penetrating a target; and, a second portion, removably attached to said first portion, the second portion having a mass greater than the mass of the first portion to optimize transfer of energy to the first portion upon contact with the target;

wherein the first and second portions separate upon impact with the target.

6. The projectile of claim 5 having a cross section which varies along its length, wherein the second portion has a cross section larger than a cross section of the first portion.

7. The projectile of claim 6 further comprising a deformable portion surrounding at least a portion of the second portion having the enlarged cross section.

8. The projectile of claim 7 wherein the deformable portion forms a fluid barrier with an interior surface of a barrel of the pneumatic gun.

9. The projectile of claim 5 further comprising a deformable portion surrounding at least a portion of the second portion.

10. The projectile of claim 9 wherein the deformable portion forms a fluid barrier with an interior surface of a barrel of the pneumatic gun.

11. The projectile of claim 5, the second portion comprising a head and a shaft extending in one direction from the head.

12. The projectile of claim 5, the first portion comprising a steel shaft.

13. The projectile of claim 5, the first portion comprising a hexagonal shaft.

\* \* \* \* \*